(12) United States Patent
Chen

(10) Patent No.: US 10,511,968 B2
(45) Date of Patent: Dec. 17, 2019

(54) USER VERIFICATION SYSTEM AND ITS IMPLEMENTING METHOD

(71) Applicant: USA CANAL SOFTWARE CO., LTD., Newark, DE (US)

(72) Inventor: Yi-Chou Chen, New Taipei (TW)

(73) Assignee: USA CANAL SOFTWARE CO., LTD., Newark, DE (US)

( * ) Notice: Subject to any disclaimer, the term of this patent is extended or adjusted under 35 U.S.C. 154(b) by 112 days.

(21) Appl. No.: 15/264,343

(22) Filed: Sep. 13, 2016

(65) Prior Publication Data

US 2017/0078882 A1    Mar. 16, 2017

(30) Foreign Application Priority Data

Sep. 14, 2015    (TW) .............................. 104130281 A

(51) Int. Cl.
*H04W 12/06*    (2009.01)

(52) U.S. Cl.
CPC .................................. *H04W 12/06* (2013.01)

(58) Field of Classification Search
CPC ........................ H04W 12/00; H04W 12/06–08
See application file for complete search history.

(56) References Cited

U.S. PATENT DOCUMENTS

| | | | | |
|---|---|---|---|---|
| 8,949,269 B1* | 2/2015 | Wolff | ........................ | G06F 7/00 707/770 |
| 2008/0010687 A1* | 1/2008 | Gonen | .................... | H04L 63/08 726/28 |
| 2011/0059727 A1* | 3/2011 | Lisboa | .................... | H04W 4/00 455/414.1 |
| 2014/0024361 A1* | 1/2014 | Poon | ...................... | H04W 12/06 455/419 |
| 2014/0068721 A1* | 3/2014 | Ong | ...................... | H04L 63/107 726/4 |
| 2014/0220933 A1* | 8/2014 | Lynes | ................. | H04L 12/1859 455/410 |
| 2015/0087303 A1* | 3/2015 | Hillary | .................. | H04W 4/021 455/435.1 |
| 2015/0215889 A1* | 7/2015 | Gonen | .................... | H04L 63/08 455/435.1 |

* cited by examiner

*Primary Examiner* — Carl G Colin
*Assistant Examiner* — Han Yang
(74) *Attorney, Agent, or Firm* — Muncy, Geissler, Olds & Lowe, P.C.

(57) ABSTRACT

The invention discloses a user verification system and its implementing method. When a mobile device connects to a registration module of the user verification device to execute registration procedure, the unregistered identification code of mobile device will be sent to the user verification device. Then, a comparison module will search and verify the unregistered identification code in the user database. If there is no matching identification codes, the registration procedure would be completed, on the contrary, a verification module will send the verification massage to mobile devices that have the same identification code. Someone who responses the verification message would proceed to execute registration and login procedures. Therefore, the invention could prevent users from being annoyed with the complex verification procedure and reduce the cost of sending verification messages.

8 Claims, 6 Drawing Sheets

| Serial No | Device identification code |
|---|---|
| User1 | 0911-415-569 |
| User2 | 0918-541-153 |
| User3 | 0932-175-264 |
| ⋮ | ⋮ |

USER VERIFICATION SYSTEM AND ITS IMPLEMENTING METHOD

BACKGROUND OF THE INVENTION (a) Field of the Invention

The present invention relates to a user verification system and its implementing method, more particularly to the user verification system and its implementing method capable of identifying a user by a device identification code and determining whether or not the registration and login are successful.

(b) Description of the Related Art

To identify a user's identification or obtain a user's data for remarketing, many service providers usually request users to input related data such as account, password, identification number, contact telephone number, address, email, etc to register as members before the users can use the provided services. Most practices require a username with a password to login and register. In other words, user needs to fill in or define her/his account and password for registration, and fill in the username and password again for login, and the system will verify the username and password. If the verification passes, then the user will be able to login successfully. To further confirm the user is not a robot, the service provider usually requests the user to verify her/his identification through a short message after the user has entered related data. In other words, the system sends a short message with a verification code to the user's contact telephone number (which is usually a mobile phone) and requests the user to complete a corresponsive procedure, such as inputting the verification code included in the short message into a webpage or replying a specific response to the short message.

The aforementioned method requests the user to input a large amount of data and makes the registration procedure very complicated, so that the users' willingness to register drops due to such poor experience. As to a user who wants to register, the user needs to verify her/his identification through a short message, and thus incurring a fee for sending a large amount of short messages and increasing the operation cost significantly. Therefore, finding a way to let users complete the registration procedure quickly and ensure the correctness and validity of users demands immediate attentions and feasible solutions.

SUMMARY OF THE INVENTION

Therefore, it is a primary objective of the present invention to provide a user verification system and its implementing method that use a device identification code as a basis for registration, and a verification procedure only takes place when the device identification code shows up repeatedly.

According to the invention, the user verification system of the present invention comprises a user verification device and a user database, and the user verification device has a registration module, a comparison module, a verification module, a login module, and a data moving module, wherein the registration module is provided for a user to perform a registration procedure to become a registered member through the information link of a mobile device, and the comparison module is provided for comparing the unregistered identification code and generating a comparison result which is a comparison pass or a comparison fail, and the verification module is capable of sending verification information to a specific device identification code, and the login module is provided for registered user to perform the login procedure through the registered identification code, and the data moving module is provided for moving the device identification code data of the registered member between different user data areas, and the user database has a first user data area and a second user data area having different identification code lists respectively. The implementing method of the user verification system of the present invention requests an input of an unregistered identification code after a registration module of a user verification device receives a registration request from a mobile device. After the unregistered identification code is inputted by a mobile device, the registration module generates an identification code comparison request. After a comparison module receives the identification code comparison request, the comparison module performs a comparison procedure of the unregistered identification code and generates a comparison result which is a comparison pass or a comparison fail. If the comparison result is a comparison pass, then the registration module will reply a successful registration message to the mobile device and a user login step will be executed. After a login module receives a login request from a mobile device, the login module confirms whether or not the unregistered identification code has been registered. If yes, the login procedure has been completed, or else a reminder message will be sent to remind the device identification code that the user has not been registered. If the comparison result is a comparison fail, an identification code verification step will be executed. After a verification module sends verification information to the unregistered identification code and the registered identification code to verify who is the actual user having the device identification code. In addition, the verified user can execute the login procedure. On the other hand, the identification code data of a user with the verification fail will be moved to the second user data area.

DETAILED DESCRIPTION OF THE PREFERRED EMBODIMENT

Figure 1:
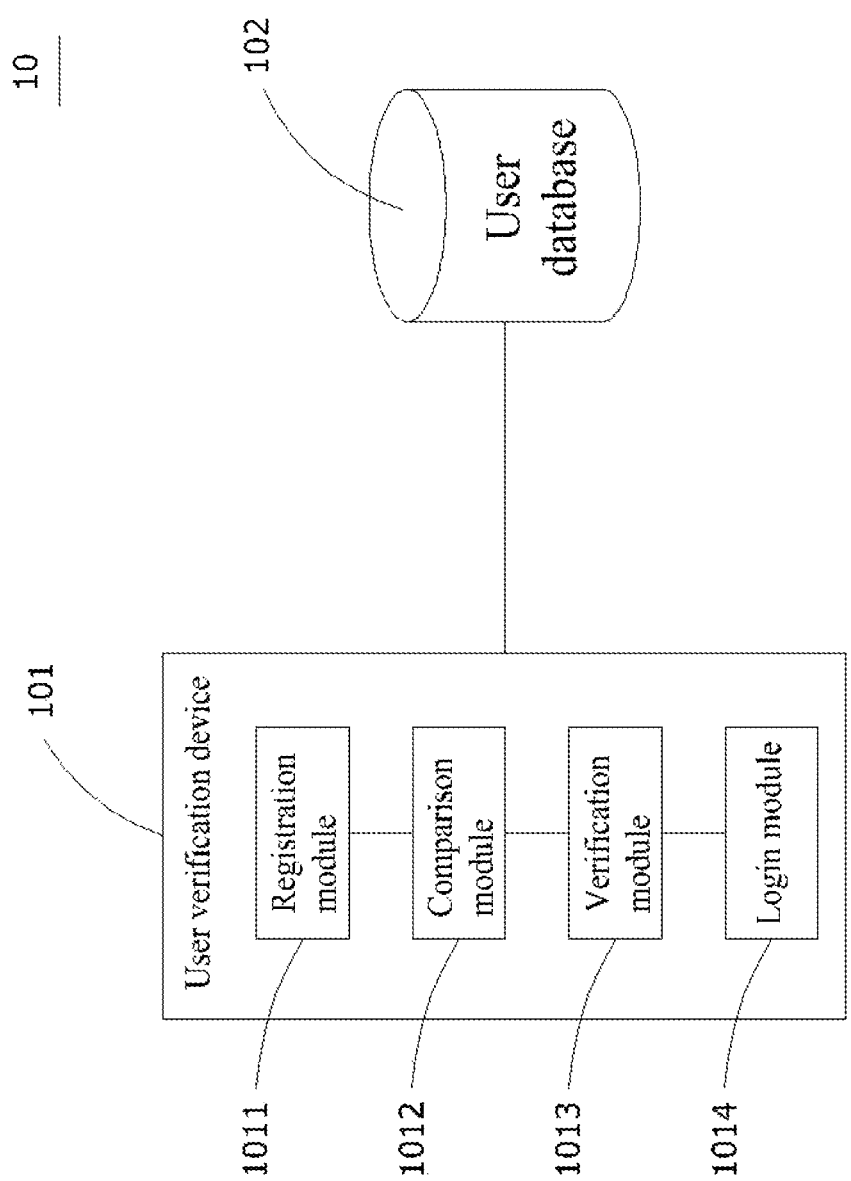
FIG. 1 is a schematic view of a system architecture of the present invention.
Figure 2:
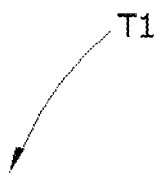
FIG. 2 is a first schematic view of an identification code list of the present invention.

With reference to FIG. 1 for a user verification system 10 of the present invention, the user verification system 10 comprises a user verification device 101 and a user database 102, and the user verification device 101 and the user database 102 are linked with each other for exchanging information, and the user verification device 101 includes a registration module 1011, a comparison module 1012, a verification module 1013, and a login module 1014, wherein the registration module 1011 is provided for a user to complete a registration procedure to become a registered member through a mobile device after linking the user verification device 101 with the user database 102. In the registration operation, the mobile device sends an unregistered identification code to the registration module 1011 of the user verification device 101, wherein the unregistered identification code may be a mobile phone number, but the invention is not limited to such arrangement only. The comparison module 1012 is provided for comparing the unregistered identification code and generating a comparison result such as a comparison pass and a comparison fail. In FIG. 2, the user database 102 includes an identification code list T1, and the identification code list T1 includes the registered users and their corresponsive device identification codes, so that the comparison module 1012 can compare the unregistered identification code with the registered identification code. If the unregistered identification code does not show up as a registered identification code in the identification code list T1, then the comparison result which is a comparison pass will be generated. On the other hand, if the unregistered identification code shows up as a registered identification code in the identification code list T1, then the comparison result which is a comparison fail will be generated, and the verification module 1013 will send verification information to a specific device identification code. In a preferred embodiment, the verification module 1013 sends the verification information through a short message, but the invention is not limited to such arrangement only. The login module 1014 is provided for the registered user to perform a login procedure through the registered identification code directly.

Figure 3:
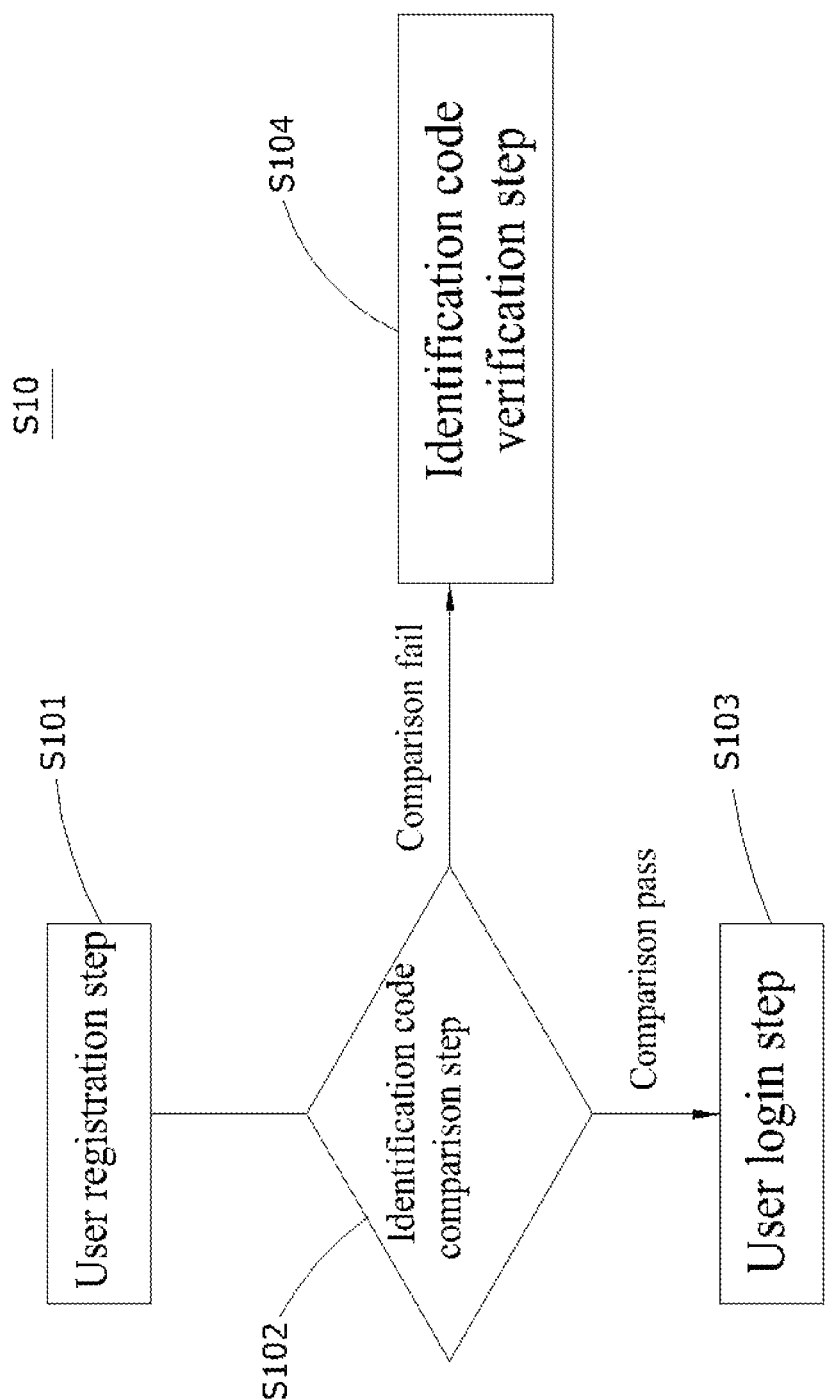
FIG. 3 is a schematic view of an implementing step of the present invention.

With reference to FIG. 3 together with FIG. 1, an implementing method S10 of a user verification system of the present invention comprises the following steps:

A user registration step S101: If a registration module 1011 of a user verification device 101 receives a registration request from a mobile device, the registration module 1011 will request an input of an unregistered identification code, wherein the device identification code is a mobile phone number. After the mobile device has completed inputting the unregistered identification code, the registration module 1011 will generate an identification code comparison request.

An identification code comparison step S102: After a comparison module 1012 of the user verification device 101 has received the identification code comparison request, the comparison module 1012 will perform a comparison procedure of the unregistered identification code and generate a comparison result which is a comparison pass or a comparison fail, and a user database 102 has an identification code list T1 containing the registered users and their corresponsive device identification codes, so that the comparison module 1012 can compare the unregistered identification code with the registered identification code. If the unregistered identification code does not show up as a registered identification code in the identification code list T1, then the comparison result which is the comparison pass will be generated, and the registration module will reply a successful registration message to the mobile device, and then a user login step S103 will be executed. On the other hand, if the unregistered identification code shows up as a registered identification code in the identification code list T1, then the comparison result which is the comparison fail will be generated, and then an identification code verification step S104 will be executed.

A user login step S103: When the comparison module 1012 generates the comparison result which is the comparison pass, it means that the unregistered identification code does not show up as a registered identification code in the identification code list T1. In other words, the user has completed the registration procedure through the unregistered identification code and become a registered member successfully, and the registration module will reply a successful registration message to the mobile device. After the registration procedure completes, the unregistered device identification code will be listed in the identification code list T1 and become a registered identification code. After a login module 1014 of the user verification device 101 has received a login request from the mobile device, the user verification device 101 will confirm whether or not the unregistered identification code has been registered. If yes, the login procedure has been completed successfully, or else, a reminder message will be sent to the device identification code to remind that the user has not been registered.

An identification code verification step S104: When the comparison module 1012 generates the comparison result which is the comparison fail, it means that the unregistered identification code shows up as a registered identification code in the identification code list T1. Now, a verification module 1013 of the user verification device 101 will send verification information to the unregistered identification code and the registered identification code in order to verify who is the actual user having the device identification code, wherein the verification information is sent through a short message.

Figure 4:
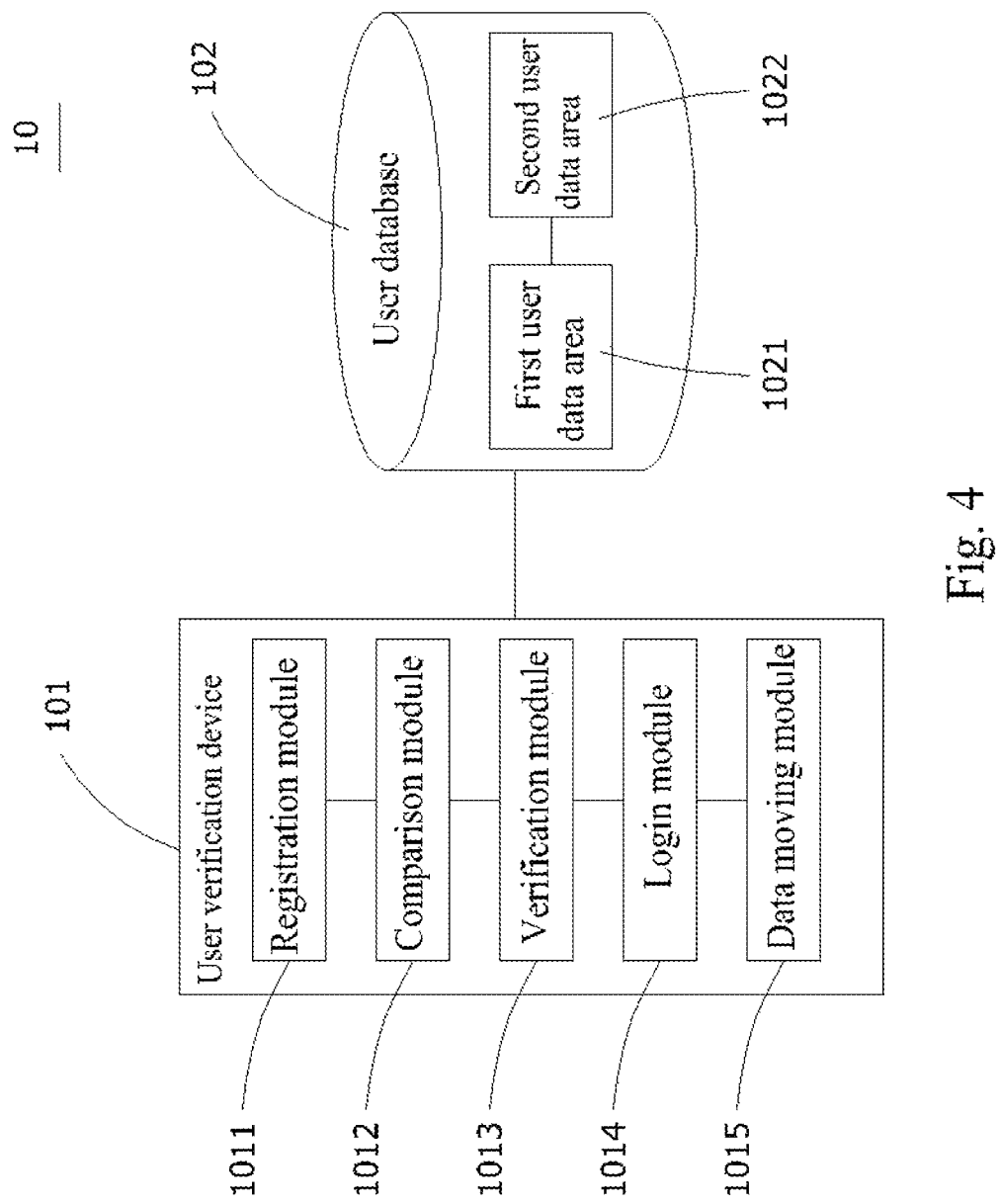
FIG. 4 is a schematic view of another system architecture of the present invention of the present invention.
Figure 5:
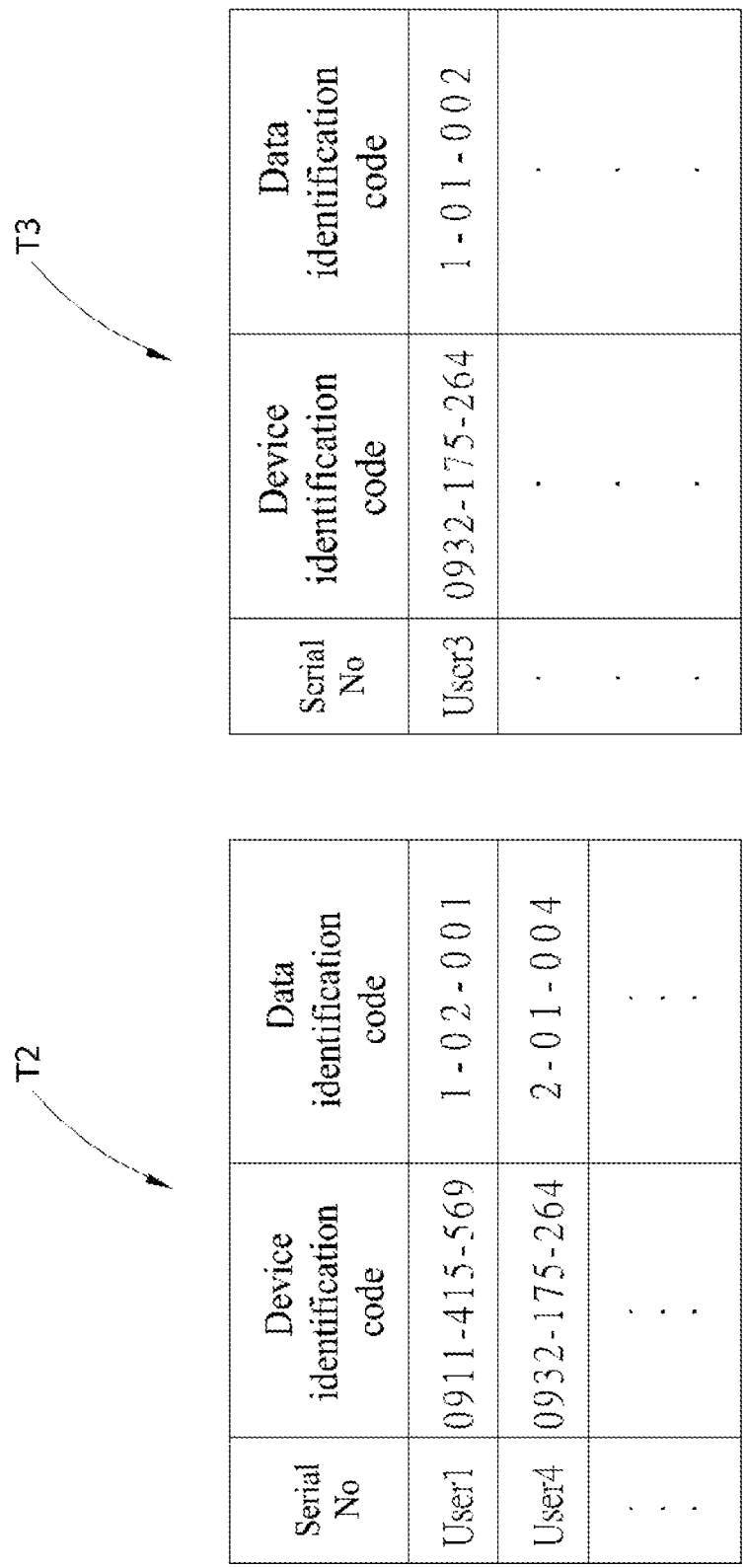
FIG. 5 is a second schematic view of an identification code list of the present invention.

With reference to FIG. 4 together with FIG. 1, the user verification device 101 of the user verification system 10 of the present invention further comprises a data moving module 1015 provided for moving the identification code data of the registered member between different user data areas, and the user database 102 has a first user data area 1021 and a second user data area 1022. In FIG. 5, the first user data area 1021 has a first identification code list T2, and the device identification code listed in the first identification code list T2 allows a user to execute the login procedure normally, and the second user data area 1022 has a second identification code list T3, and the device identification code listed in the second identification code list T3 is locked by the system, and the login procedure is not allowed. Wherein, the user database 102 encodes a data identification code for each record of the device identification code in order to identify different users who use the same device identification code for registration.

Figure 6:
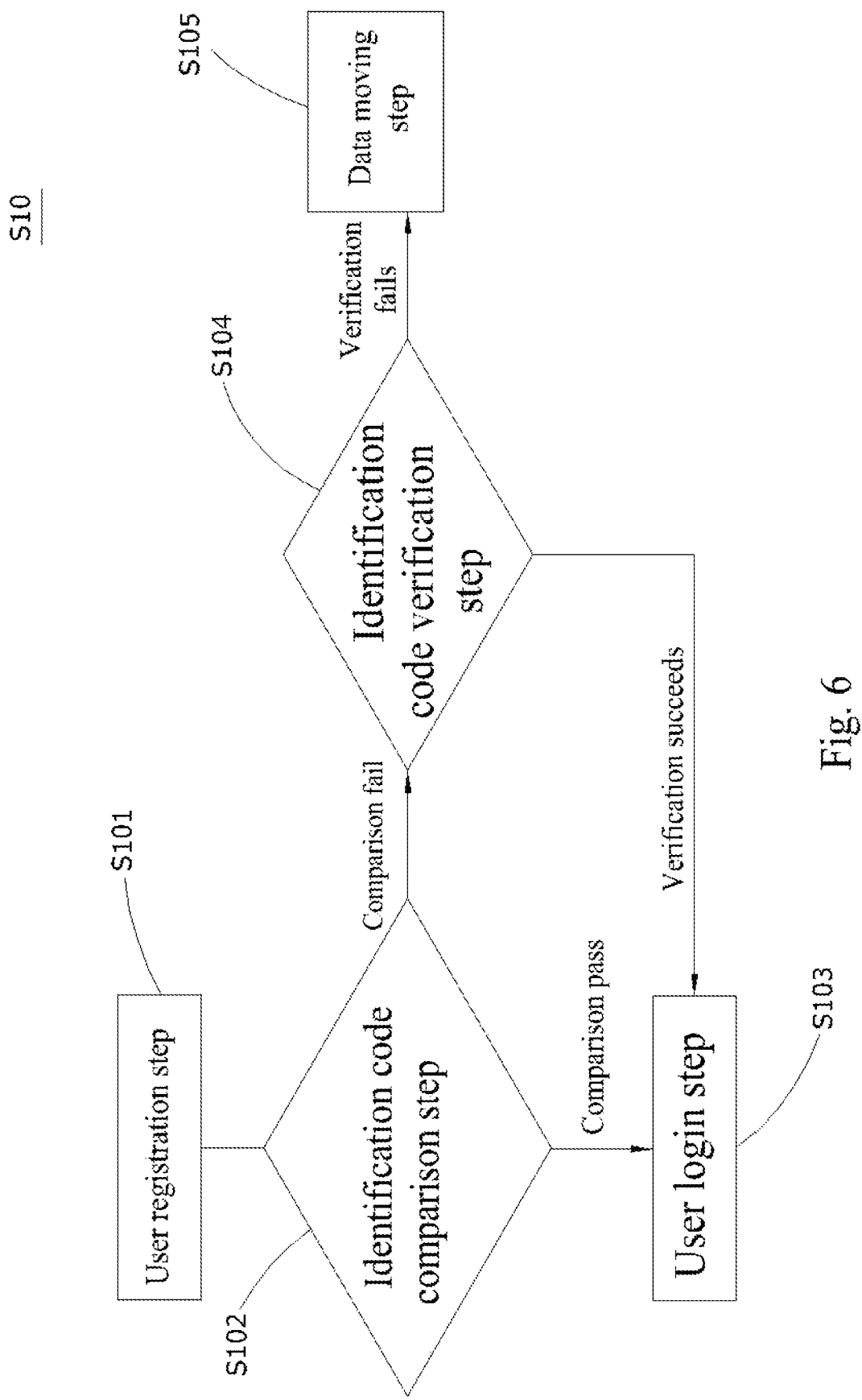
FIG. 6 is a schematic view of another implementing step of the present invention.

With reference to FIG. 6 together with FIG. 4, the implementing method S10 of the user verification system of the present invention further comprises the following step after the identification code verification step S104:

A data moving step S105: After the verification module 1013 of the user verification device 101 sends the verification information to the unregistered identification code and the registered identification code, the verification module verifies who is the user actually having the device identification code and allows the user to execute the login procedure. On the other hand, a user with a verification fail, the user's identification code data will be moved to a second identification code list T3 of the second user data area 1022.

In summation of the description above, the user verification system of the present invention comprises a user verification device and a user database, and the user verification device has a registration module, a comparison module, a verification module, a login module, and a data moving module, wherein the registration module is provided for a user to perform a registration procedure to become a registered member through the information link of a mobile device, and the comparison module is provided for comparing the unregistered identification code and generating a comparison result which is a comparison pass or a comparison fail, and the verification module is capable of sending verification information to a specific device identification code, and the login module is provided for registered user to perform the login procedure through the registered identification code, and the data moving module is provided for moving the device identification code data of the registered member between different user data areas, and the user database has a first user data area and a second user data area having different identification code lists respectively.

The implementing method of the user verification system of the present invention requests an input of an unregistered identification code after a registration module of a user verification device receives a registration request from a mobile device. After the unregistered identification code is inputted by a mobile device, the registration module generates an identification code comparison request. After a comparison module receives the identification code comparison request, the comparison module performs a comparison procedure of the unregistered identification code and generates a comparison result which is a comparison pass or a comparison fail. If the comparison result is a comparison pass, then the registration module will reply a successful registration message to the mobile device and a user login step will be executed. After a login module receives a login request from a mobile device, the login module confirms whether or not the unregistered identification code has been registered. If yes, the login procedure has been completed, or else a reminder message will be sent to remind the device identification code that the user has not been registered. If the comparison result is a comparison fail, an identification code verification step will be executed. After a verification module sends verification information to the unregistered identification code and the registered identification code to verify who is the actual user having the device identification code. In addition, the verified user can execute the login procedure. On the other hand, the identification code data of a user with the verification fail will be moved to the second user data area.

In summation, the present invention provides a user verification system and its implementing method that uses a device identification code as the basis for registration, and the verification procedure can take place only if the device identification code shows up repeatedly.

While the invention has been described by means of specific embodiments, numerous modifications and variations could be made thereto by those skilled in the art without departing from the scope and spirit of the invention set forth in the claims.

What is claimed is:

1. A user verification system for enhancing the efficiency of completing a registration procedure and reducing an amount of verification information sent by the user verification system, comprising:

a user verification device comprising a processor and a memory coupled to the processor, including a registration module, a comparison module and a verification module, and the registration module being provided for receiving a registration request from a mobile device, and generating an identification code comparison request having an unregistered identification code, and the comparison module being provided for receiving the identification code comparison request, comparing the unregistered identification code with a registered identification code of an identification code list, generating a comparison result including a comparison pass or a comparison fail, and the verification module being capable of sending the verification information; and a user database, linked with the user verification device for exchanging information, and including the identification code list, and the identification code list having the registered identification code;

thereby, if the comparison module generates the comparison result which is the comparison pass meaning that the unregistered identification code does not show up in the identification code list, then the registration module will reply a successful registration message to the mobile device, and the verification module does not need to send the verification information to the unregistered identification code at the registration procedure, and thereby, if the comparison module generates the comparison result which is the comparison fail meaning that the unregistered identification code shows up as the registered identification code in the identification code list, then the verification module will send the verification information to a device with the unregistered identification code and a device with the registered identification code in order to verify who is the actual user having the identification code at the registration procedure; wherein the registration module, the comparison module, and the verification module comprise instructions executed by the user verification device.

2. The user verification system of claim 1, wherein the user verification device further includes a login module provided for a registered user to perform a login procedure through the registered identification code; wherein the login module comprises instructions executed by the user verification device.

3. The user verification system of claim 1, wherein the user database further includes a first user data area and a second user data area, and the first user data area has a first identification code list which is the registered identification code capable of performing the login procedure normally, and the second user data area has a second identification code list which is the registered identification code not capable of performing the login procedure normally.

4. The user verification system of claim 3, wherein the user verification device further includes a data moving module for moving the registered identification code between the first user data area and the second user data area; wherein the data moving module comprises instructions executed by the user verification device.

5. The user verification system of claim 1, wherein the unregistered identification code and the registered identification code are mobile phone numbers and the verification module sends the verification information through a short message.

6. An implementing method of a user verification system for enhancing the efficiency of completing a registration procedure and reducing an amount of verification information sent by the user verification system, comprising the following steps:

a user registration step, wherein when a registration module of a user verification device has received a registration request from a mobile device, the registration module requests an input of an unregistered identification code, and generates an identification code comparison request after the unregistered identification code is inputted;

an identification code comparison step, wherein after a comparison module of the user verification device receives the identification code comparison request, the unregistered identification code is compared with a registered identification code of an identification code list of a user database and a comparison result which is a comparison pass or a comparison fail is generated;

an identification code verification step, wherein if the comparison module generates the comparison result which is the comparison fail meaning that the unregistered identification code shows up as the registered identification code in the identification code list, then a verification module of the user verification device will send the verification information to a device with the unregistered identification code and a device with the registered identification code in order to verify who is the actual user having the identification code at the registration procedure; and thereby, if the comparison module generates the comparison result which is the comparison pass meaning that the unregistered identification code does not show up in the identification code list, then the verification module of the user verification device does not need to send the verification information to the unregistered identification code at the registration procedure; wherein the registration module, the comparison module, and the verification module comprise instructions executed by the user verification device.

7. The implementing method of claim 6, further comprising the following step after the identification code comparison step:

a user login step, wherein if the comparison result generated by the comparison module is the comparison pass, then the registration module will reply a successful registration message to the mobile device, and a login module of the user verification device will be able to receive a login request from the mobile device; wherein the login module comprises instructions executed by the user verification device.

8. The implementing method of claim 6, further comprising the following step after the identification code verification step:

a data moving step, wherein after the verification module of the user verification device sends the verification information to a device with the unregistered identification code and a device with the registered identification code, and if the verification of the unregistered identification code fails, the the registration will be unable to complete, if the verification of the registered identification code fails, then a data moving module of the user verification device will move the registered identification code from a first user data area to a second user data area; wherein the data moving module comprises instructions executed by the user verification device.

* * * * *